United States Patent
Vaage et al.

(10) Patent No.: US 7,684,281 B2
(45) Date of Patent: Mar. 23, 2010

(54) SYSTEM FOR COMBINING SIGNALS OF PRESSURE SENSORS AND PARTICLE MOTION SENSORS IN MARINE SEISMIC STREAMERS

(75) Inventors: Svein Torleif Vaage, Weybridge (GB); Stig Rune Lennart Tenghamn, Katy, TX (US); Claes Nicolai Borresen, Katy, TX (US)

(73) Assignee: PGS Americas, Inc., Houston, TX (US)

( * ) Notice: Subject to any disclaimer, the term of this patent is extended or adjusted under 35 U.S.C. 154(b) by 0 days.

(21) Appl. No.: 12/082,804

(22) Filed: Apr. 14, 2008

(65) Prior Publication Data

US 2008/0192571 A1 Aug. 14, 2008

Related U.S. Application Data

(63) Continuation of application No. 10/792,510, filed on Mar. 3, 2004, now Pat. No. 7,359,283.

(51) Int. Cl.
G01V 1/38 (2006.01)
(52) U.S. Cl. .................. 367/24; 367/15; 367/21
(58) Field of Classification Search .................. 367/15, 367/21, 24
See application file for complete search history.

(56) References Cited

U.S. PATENT DOCUMENTS

| | | | |
|---|---|---|---|
| 4,486,865 A | 12/1984 | Ruehle | |
| 4,520,467 A * | 5/1985 | Berni | 367/24 |
| 4,935,903 A | 6/1990 | Sanders et al. | |
| 4,979,150 A | 12/1990 | Barr | |
| 5,235,554 A * | 8/1993 | Barr et al. | 367/21 |
| 5,621,700 A | 4/1997 | Moldoveanu | |
| 5,757,720 A * | 5/1998 | Soubaras | 367/24 |
| 5,774,416 A | 6/1998 | Sadek et al. | |
| 5,774,417 A * | 6/1998 | Corrigan et al. | 367/24 |
| 5,835,451 A * | 11/1998 | Soubaras | 367/24 |
| 6,141,623 A * | 10/2000 | Paffenholz | 367/24 |
| 6,263,285 B1 | 7/2001 | Starr | |
| 6,512,980 B1 * | 1/2003 | Barr | 702/1 |
| 6,678,207 B2 * | 1/2004 | Duren | 367/24 |
| 6,775,618 B1 * | 8/2004 | Robertsson et al. | 702/14 |
| 2002/0156583 A1 * | 10/2002 | Sen et al. | 702/17 |
| 2003/0028326 A1 | 2/2003 | Monk et al. | |
| 2003/0147306 A1 * | 8/2003 | Robertsson | 367/24 |
| 2004/0042341 A1 | 3/2004 | Tenghamn et al. | |
| 2004/0145968 A1 * | 7/2004 | Brittan et al. | 367/15 |
| 2005/0013194 A1 * | 1/2005 | Vaage et al. | 367/24 |

* cited by examiner

*Primary Examiner*—Jack W. Keith
*Assistant Examiner*—Scott A Hughes
(74) *Attorney, Agent, or Firm*—E. Eugene Thigpen; Charles R. Schweppe

(57) ABSTRACT

Signals of pressure sensors and particle motion sensors located in marine seismic streamers are combined to generate a seismic wavefield. At least a part of the particle motion sensor signal is calculated from a recorded pressure signal and the calculated at least a part of the particle motion sensor signal is used to generate a particle motion sensor signal in which noise is substantially attenuated in at least a lower frequency range thereof. The pressure sensor data and the noise attenuated particle motion sensor signal can then be combined to calculate up- and down-going wavefields.

20 Claims, 9 Drawing Sheets

SYSTEM FOR COMBINING SIGNALS OF PRESSURE SENSORS AND PARTICLE MOTION SENSORS IN MARINE SEISMIC STREAMERS

CROSS-REFERENCES TO RELATED APPLICATIONS

This application is a continuation of U.S. patent application Ser. No. 10/792,510 filed on Mar. 3, 2004, now U.S. Pat. No. 7,359,283 which is herewith.

FEDERALLY SPONSOR RESEARCH OR DEVELOPMENT

Not Applicable

Sequence Listing, Table, or Computer Listing

Not Applicable

BACKGROUND OF THE INVENTION

1. Field of the Invention

This invention relates generally to the field of geophysical prospecting. More particularly, the invention relates to the field of marine seismic exploration. Specifically, the invention is a system for combining signals of pressure sensors and particle motion sensors in marine seismic streamers.

2. Description of the Related Art

In seismic exploration, geophysical data are obtained by applying acoustic energy to the earth from an acoustic source and detecting seismic energy reflected from interfaces between different layers in subsurface formations. The seismic wavefield is reflected when there is a difference in acoustic impedance between the layer above the interface and the layer below the interface. When using towed streamers in marine seismic exploration, a seismic streamer is towed behind an exploration vessel at a water depth typically between about six to about nine meters, but can be towed shallower or deeper. Hydrophones are included in the streamer cable for detecting seismic signals. A hydrophone is a submersible pressure gradient sensor that converts pressure waves into electrical or optical signals that are typically recorded for signal processing, and evaluated to estimate characteristics of the subsurface of the earth.

In a typical geophysical exploration configuration, a plurality of streamer cables are towed behind a vessel. One or more seismic sources are also normally towed behind the vessel. The seismic source, which typically is an airgun array, but may also be a water gun array or other type of source known to those of ordinary skill in the art, transmits seismic energy or waves into the earth and the waves are reflected back by reflectors in the earth and recorded by sensors in the streamers. Paravanes are typically employed to maintain the cables in the desired lateral position while being towed. Alternatively, the seismic cables are maintained at a substantially stationary position in a body of water, either floating at a selected depth or lying on the bottom of the body of water, in which case the source may be towed behind a vessel to generate acoustic energy at varying locations, or the source may also be maintained in a stationary position.

After the reflected wave reaches the streamer cable, the wave continues to propagate to the water/air interface at the water surface, from which the wave is reflected downwardly, and is again detected by the hydrophones in the streamer cable. The water surface is a good reflector and the reflection coefficient at the water surface is nearly unity in magnitude and is negative in sign for pressure signals. The waves reflected at the surface will thus be phase-shifted 180 degrees relative to the upwardly propagating waves. The downwardly propagating wave recorded by the receivers is commonly referred to as the surface reflection or the "ghost" signal. Because of the surface reflection, the water surface acts like a filter, which creates spectral notches in the recorded signal, making it difficult to record data outside a selected bandwidth. Because of the influence of the surface reflection, some frequencies in the recorded signal are amplified and some frequencies are attenuated.

Maximum attenuation will occur at frequencies for which the propagation distance between the detecting hydrophone and the water surface is equal to one-half wavelength. Maximum amplification will occur at frequencies for which the propagation distance between the detecting hydrophone and the water surface is one-quarter wavelength. The wavelength of the acoustic wave is equal to the velocity divided by the frequency, and the velocity of an acoustic wave in water is about 1500 meters/second. Accordingly, the location in the frequency spectrum of the resulting spectral notch is readily determinable. For example, for a seismic streamer at a depth of 7 meters, and waves with vertical incidence, maximum attenuation will occur at a frequency of about 107 Hz and maximum amplification will occur at a frequency of about 54 Hz.

It has not been common practice to tow streamer cables deeper than about nine meters because the location of the spectral notch in the frequency spectrum of the signal detected by a hydrophone substantially diminishes the utility of the recorded data. It has also not been common practice to tow streamer cables at depth less than six meters, because of the significant increase in surface related noise induced in the seismic streamer data.

It is also common to perform marine seismic operations in which sensors are deployed at the water bottom. Such operations are typically referred to as "ocean bottom seismic" operations. In ocean bottom seismic operations, both pressure sensors (hydrophones) and particle motion sensors (geophones, accelerometers) are deployed at the ocean floor to record seismic data.

A particle motion sensor, such as a geophone, has directional sensitivity, whereas a pressure sensor, such as hydrophone, does not. Accordingly, the upgoing wavefield signals detected by a geophone and hydrophone located close together will be in phase, while the downgoing wavefield signals will be recorded 180 degrees out of phase. Various techniques have been proposed for using this phase difference to reduce the spectral notches caused by the surface reflection and, if the recordings are made on the seafloor, to attenuate water borne multiples. It should be noted that an alternative to having the geophone and hydrophone co-located, is to have sufficient spatial density of sensors so that the respective wavefields recorded by the hydrophone and geophone can be interpolated or extrapolated to produce the two wavefields at the same location.

U.S. Pat. No. 4,486,865 to Ruehle, for example, teaches a system for suppressing ghost reflections by combining the outputs of pressure and velocity detectors. The detectors are paired, one pressure detector and one velocity detector in each pair. A filter is said to change the frequency content of at least one of the detectors so that the ghost reflections cancel when the outputs are combined.

U.S. Pat. No. 5,621,700 to Moldovenu also teaches using at least one sensor pair comprising a pressure sensor and a velocity sensor in an ocean bottom cable in a method for attenuating ghosts and water layer reverberations.

U.S. Pat. No. 4,935,903 to Sanders et al. teaches a marine seismic reflection prospecting system that detects seismic waves traveling in water by pressure sensor-particle velocity sensor pairs (e.g., hydrophone-geophone pairs) or alternately, vertically-spaced pressure sensors. Instead of filtering to eliminate ghost reflection data, the system calls for enhancing primary reflection data for use in pre-stack processing by adding ghost data.

U.S. Pat. No. 4,979,150 to Barr provides a method for marine seismic prospecting said to attenuate coherent noise resulting from water column reverberation by applying a scale factor to the output of a pressure transducer and a particle velocity transducer positioned substantially adjacent to one another in the water. It is stated in the patent that the transducers may be positioned either on the ocean bottom or at a location in the water above the bottom, although the ocean bottom is said to be preferred.

Co-pending U.S. patent application Ser. No. 10/233,266, filed on Aug. 30, 2002, entitled "Apparatus and Method for Multicomponent Marine Geophysical Data Gathering", with a co-inventor of the present invention and assigned to the assignee of the present invention, describes a particle motion sensor for use in a streamer cable and a method for equalizing and combining the output signals of the particle motion sensor and a co-located pressure gradient sensor.

As the cited patents show, it is well known in the art that pressure and particle motion signals can be combined to derive both the up-going and the down-going wavefield. For sea floor recordings, the up-going and down-going wavefields may subsequently be combined to remove the effect of the surface reflection and to attenuate water borne multiples in the seismic signal. For towed streamer applications, however, the particle motion signal has been regarded as having limited utility because of the high noise level in the particle motion signal. However, if particle motion signals could be provided for towed streamer acquisition, the effect of the surface reflection could be removed from the data.

Co-pending U.S. patent application Ser. No. 10/621,222, filed on Jul. 16, 2003, entitled "Method for Seismic Exploration Utilizing Motion Sensor and Pressure Sensor Data", with a co-inventor of the present invention and assigned to the assignee of the present invention, describes a procedure for attenuating multiples by combining up- and down-going wavefields, measured in the water column, where the wavefields are calculated from combining pressure sensors like hydrophones and motion sensors like geophones. The procedure assumes, however, that both the pressure and the motion data have the same bandwidth.

It has been difficult to achieve the same bandwidth in the motion sensor data as in the pressure sensor data, however, because of the noise induced by vibrations in the streamer, which is sensed by the particle motion sensors. The noise is, however, mainly confined to lower frequencies. One way to reduce the noise is to have several sensors in series or in parallel. This approach, however, does not always reduce the noise enough to yield a signal-to-noise ratio satisfactory for further seismic processing.

Thus, a need exists for a method for obtaining a useful particle motion signal with a satisfactory signal-to-noise ratio at low frequencies. In particular, a need exists for a method to generate a particle motion signal with substantially the same bandwidth as a recorded pressure signal, for particle motion and pressure sensors located in a towed marine seismic streamer.

BRIEF SUMMARY OF THE INVENTION

The invention is a method for combining signals of pressure sensors and particle motion sensors located in marine seismic streamers. Then, a particle motion sensor signal is calculated at low frequencies from the pressure sensor signal, using the depth of the marine seismic streamer and the sound wave velocity in water.

In a further embodiment of the invention, a full three-dimensional mathematical solution takes account of the fact that the energy returning from the earth arrives at the receivers at a range of angles of incidence, rather than solely in the in-line direction or at a given direction, such as the vertical.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

Figure 1:
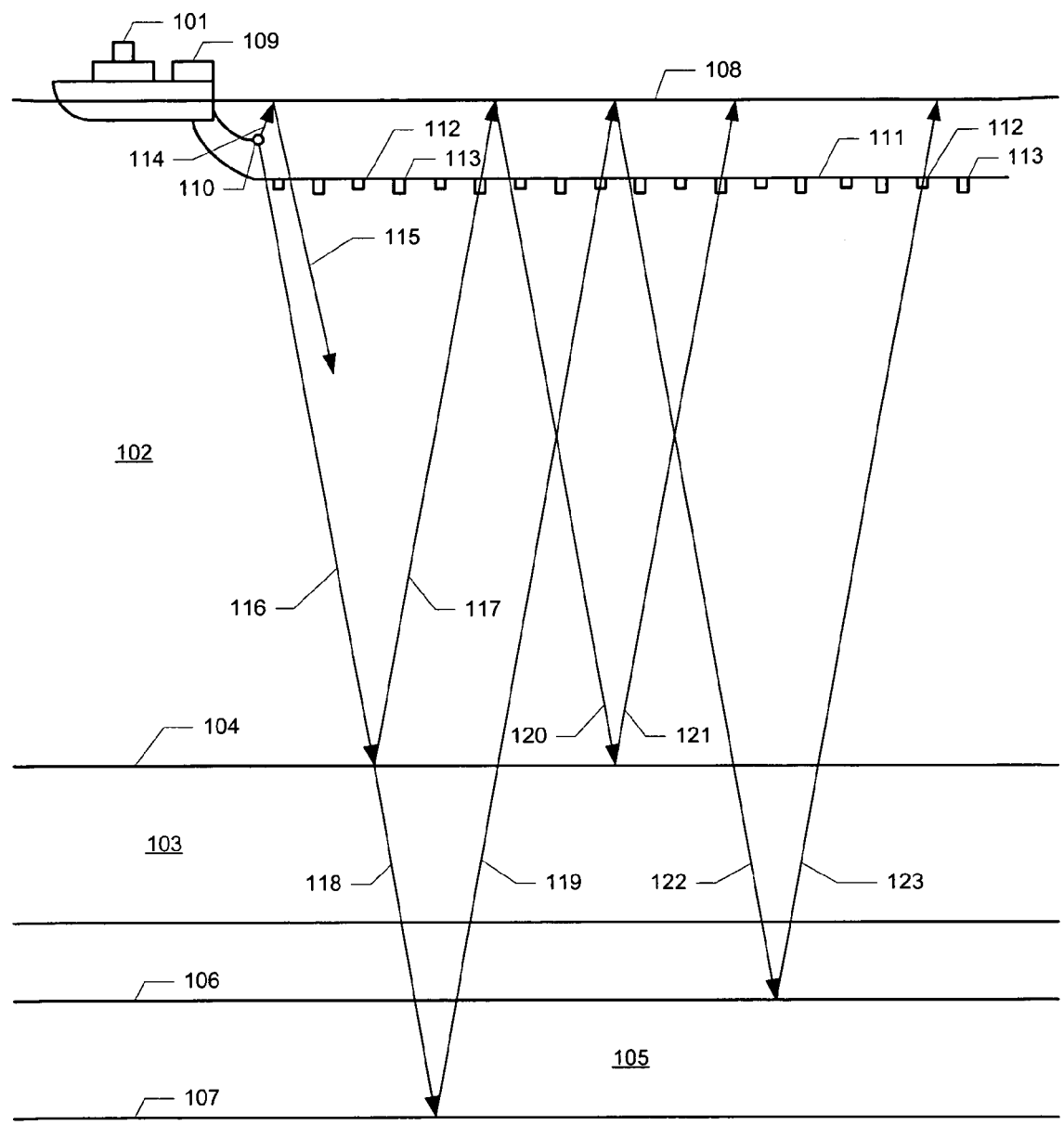
FIG. 1 is an illustration of a method for acquiring marine seismic data that can be used with the method of the invention.

FIG. 1 shows a schematic illustration (not drawn to scale) of a method for acquiring marine seismic data that can be used with the method of the invention. A seismic vessel 101 is located in a body of water 102 above the earth 103. Beneath the water bottom 104, the earth 103 contains subterranean formations of interest such as layer 105 positioned between upper boundary 106 and lower boundary 107. The seismic vessel 101 travels on the water surface 108 and contains seismic acquisition control equipment, designated generally at 109. The seismic acquisition control equipment 109 includes navigation control, seismic source control, seismic sensor control, and recording equipment, all of types well known in the art of seismic acquisition.

The seismic acquisition control equipment 109 causes a seismic source 110 towed in the body of water 102 by the seismic vessel 101 to actuate at selected times. The seismic source 110 may be of any type well known in the art of seismic acquisition, including airguns or water guns, or particularly, arrays of airguns. Seismic streamers 111 are also towed in the body of water 102 by the seismic vessel 101 to record the acoustic wavefields initiated by the seismic source 110 and reflected from interfaces in the environment. Although only one seismic streamer 111 is shown here for illustrative purposes, typically a plurality of seismic streamers 111 are towed behind the seismic vessel 101. The seismic streamers 111 contain sensors to detect the reflected wavefields initiated by the seismic source 110. Conventionally, the seismic streamers 111 contained pressure sensors such as hydrophones 112, but dual sensor seismic streamers 111 also contain water particle motion sensors such as geophones 113. The hydrophones 112 and geophones 113 are typically co-located in pairs or pairs of sensor arrays at regular intervals along the seismic streamers 111. However, the type of sensors 112, 113 or their location in the seismic streamers 111 is not intended to be a limitation on the present invention.

Each time the seismic source 110 is actuated, an acoustic wavefield travels both upwardly or downwardly in spherically expanding wave fronts. The propagation of the wave fronts will be illustrated herein by ray paths which are perpendicular to the wave fronts. The upwardly traveling wavefield, designated by ray path 114, will reflect off the water-air interface at the water surface 108 and then travel downwardly, as in ray path 115, where the wavefield may be detected by the hydrophones 112 and geophones 113 in the seismic streamers 111. Unfortunately, such a reflection at the water surface 108, as in ray path 115 contains no useful information about the subterranean formations of interest. However, such surface reflections, also known as ghosts, act like secondary seismic sources with a time delay.

The downwardly traveling wavefield, in ray path 116, will reflect off the earth-water interface at the water bottom 104 and then travel upwardly, as in ray path 117, where the wavefield may be detected by the hydrophones 112 and geophones 113. Such a reflection at the water bottom 104, as in ray path 117, contains information about the water bottom 104. Ray path 117 is an example of a primary reflection, having one reflection in the subterranean earth. The downwardly traveling wavefield, as in ray path 116, may transmit through the water bottom 104 as in ray path 118, reflect off a layer boundary, such as 107, of a layer, such as 105, and then travel upwardly, as in ray path 119. The upwardly traveling wavefield, ray path 119, may then be detected by the hydrophones 112 and geophones 113. Such a reflection off a layer boundary 107 contains useful information about a formation of interest 105 and is also an example of a primary reflection, having one reflection in the subterranean earth.

Unfortunately, the acoustic wavefields will continue to reflect off interfaces such as the water bottom 104, water surface 108, and layer boundaries 106, 107 in combinations. For example, the upwardly traveling wavefield in ray path 117 will reflect off the water surface 108, continue traveling downwardly in ray path 120, may reflect off the water bottom 104, and continue traveling upwardly again in ray path 121, where the wavefield may be detected by the hydrophones 112 and geophones 113. Ray path 121 is an example of a multiple reflection, also called simply a "multiple", having multiple reflections from interfaces. Similarly, the upwardly traveling wavefield in ray path 119 will reflect off the water surface 108, continue traveling downwardly in ray path 122, may reflect off a layer boundary 106 and continue traveling upwardly again in ray path 123, where the wavefield may be detected by the hydrophones 112 and geophones 113. Ray path 123 is another example of a multiple reflection, also having multiple reflections in the subterranean earth. Multiple reflections contain redundant information about the formations of interest and commonly are removed from seismic data before further processing.

The invention is a method for combining signals of pressure sensors (typically hydrophones) and particle motion sensors (typically geophones or accelerometers) located in seismic streamers. The combined signals can then be utilized to generate the up- and down-going wavefields, which are useful for further seismic processing, such as attenuation of multiples in marine seismic data. Since a recorded particle motion signal is often contaminated by low frequency noise due to the vibrations in a towed streamer, the signal-to-noise ratio for the combined signals would be poor. The particle motion signal may be calculated from the pressure sensor signal within a given frequency range if the spectrum of the pressure sensor signal has a satisfactory signal-to-noise ratio within this frequency range (and has no notches within this frequency range) and if the depth of the pressure and particle motion sensors is known. If the depth to the sensors is unknown, the depth can be calculated from the frequency of the spectral notches introduced by the surface reflection, a process which is well known in the art.

The low frequency part of the particle motion signal will typically need to be replaced because it has a low signal-to-noise ratio. This low frequency part will be referred to as the 'Frequency Range'. The corresponding portion of the pressure sensor signal to be used for calculating the particle motion signal, will typically have a good signal-to-noise ratio in the Frequency Range. Therefore, the depth of the pressure sensor is preferably chosen so that the frequency of the first spectral notch in the pressure sensor signal caused by the surface reflection is higher than the Frequency Range.

The method of the invention is particularly useful for towed marine seismic streamers, since the vibration of a towed streamer adds a significant amount of noise to the signal of the particle motion sensor. Thus the method of the invention will be illustrated in terms of towed streamers.

The method of the invention employs pressure sensors that are responsive to pressure changes in the medium to which the pressure sensors are coupled. The medium typically is water. For clarity only, the method of the invention will be illustrated by the use of hydrophones, but this is not meant to limit the invention.

The method of the invention employs particle motion sensors that are responsive to motions in the particles of the water to which the motion sensors are coupled. In general, particle motion sensors may be responsive to the displacement of the particles, the velocity of the particles, or the acceleration of the particles in the medium. In the present invention, particle velocity sensors are preferred. Thus, if motion sensors are used which are responsive to position, then preferably the position signal is differentiated to convert it to a velocity signal by computational means well known in the art. If motion sensors are used which are responsive to acceleration (typically called accelerometers), then preferably the acceleration signal is integrated to convert it to a velocity signal by computational means well known in the art.

In an alternative embodiment of the invention, multi-component motion sensors are employed in the seismic cable. For clarity only, this embodiment of the invention will be illustrated by the use of geophones, but this is not meant to limit the invention. In the particular example of a three-component geophone, a geophone is mounted to sense particle velocity in the vertical direction. This geophone is called a vertical geophone. Two geophones are mounted in orthogonal directions with respect to each other, and to the vertically mounted geophone, to sense horizontal motion. Typically, a three-component geophone is oriented to sense motion in the vertical direction, in an in-line direction, and in a cross-line direction. Positioning these geophones in these three directions enables the propagation direction of an incoming signal to be detected. It also enables the detection of strumming or other mechanical behavior of the seismic cable. For clarity, the method of the invention will be illustrated by the use of vertical geophones, but this is not meant to limit the invention.

Accelerometers could be used as particle motion sensors as an alternative to use of geophones, although the output signal will need to be integrated to obtain velocity. Some accelerometers generate an output signal that is indicative of the variation in orientation of the accelerometer from a selected orientation. Accordingly, if sets of two accelerometers (for situations in which the in-line direction is known) or sets of three accelerometers (if the in-line direction is not known) are utilized, the sensor orientation may be computed and it is not necessary to maintain the accelerometers in a specific orientation.

Figure 2:
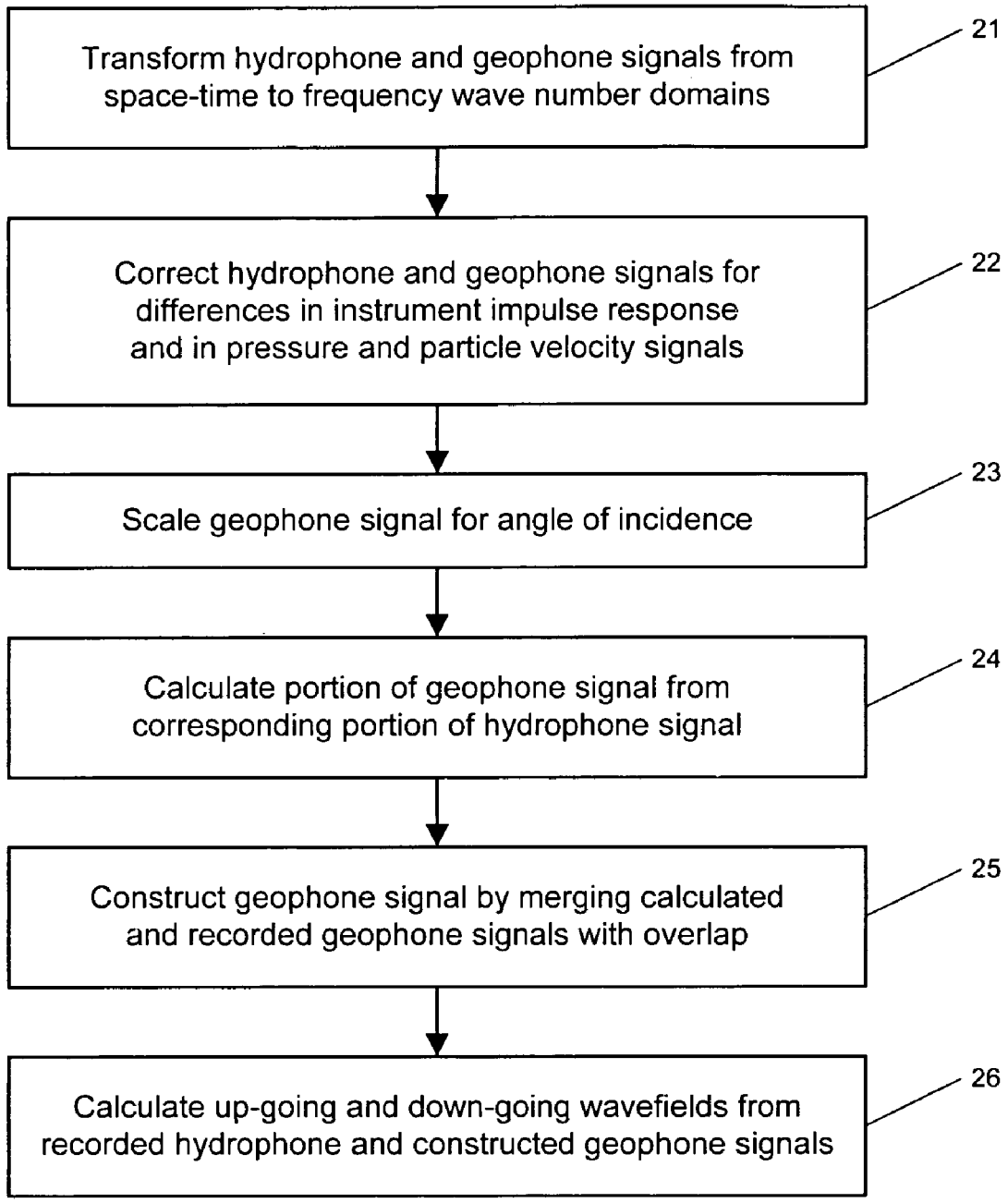
FIG. 2 is a flowchart illustrating the processing steps of an embodiment of the method of the invention for combining signals of pressure sensors like hydrophones and particle motion sensors like geophones, located in a marine seismic streamer.

The method of the invention will be illustrated by the discussion with reference to the flowchart presented in FIG. 2. The method of the invention is illustrated herein by the use of hydrophones as pressure sensors and vertical geophones as particle motion sensors, but this is not meant to limit the invention. In the examples discussed below with reference to FIGS. 3-9, the hydrophone and geophone systems are positioned 0.7 m apart in a towed seismic streamer with a length of 1300 m, at a depth of 13 m, and with a seismic source at a depth of 7 m. The horizontal distance between the source and the hydrophone/geophone systems was approximately 1300 m. The specifics of these examples are for illustrative purposes only and are not intended to limit the invention.

FIG. 2 shows a flowchart illustrating the processing steps of an embodiment of the method of the invention for calculating a geophone signal from a hydrophone signal and then combining signals from hydrophones and geophones located in marine seismic streamers.

In the following discussion, signals in the space-time domain are denoted by lower case letters, while the same signals in the frequency wave-number domain are denoted by the corresponding upper case (capital) letters.

In the preferred embodiment of the invention, $\bar{x}$ (space) is a vector and equal to $(x, y)$, where x is the direction along the streamers and y is the cross line direction. In other embodiments y can be kept constant so that each cable is analyzed separately. One possible reason to select this option could be that the cables are deployed at significant different depths. Also, in other embodiments, also x can be kept constant so that each sensor is analyzed individually. The latter will typically be a preferred option if the depth of the sensors within each cable varies significantly.

In the preferred embodiment of the invention, $\bar{k}$ (wave number) is a vector and equal to $(k_x, k_y)$, where $k_x$ is the wave number in the x direction and $k_y$ is the wave number in the y direction. In other embodiments, $k_y$ can be disregarded so that each cable is analyzed separately. In this case a fixed direction of cross line propagation for each cable is selected. This direction could be vertical or any other direction. One possible reason to select this option could be that the cables are deployed at significantly different depths. Also, in other embodiments, both $k_x$ and $k_y$ can be disregarded so that each sensor is analyzed individually and only the frequency spectrum of each recorded trace is used. In this case a fixed direction of propagation in both the in-line and cross-line direction is used for each sensor. The latter will typically be a preferred option if the depth of the sensors within each cable varies significantly. In this case the transformed data will be in the f-x domain.

The discussion below uses examples from marine seismic exploration for targets at depths from a few hundred meters to a few kilometers, so called deep seismic exploration. The present invention is, however, applicable to exploration for both shallower and deeper targets.

At step 21 of FIG. 2, a set of hydrophone data $h_{signal}(\bar{x},t)$ and a corresponding set of geophone data $g_{signal}(\bar{x},t)$ are transformed from the space-time domain to the frequency-wave number domain, yielding a transformed hydrophone signal $H_{signal}(f,\bar{k})$ and a transformed geophone signal $G_{signal}(f,\bar{k})$, respectively. Preferably, the transform is a Fourier Transform, but this is not a restriction of the invention.

The method of the invention can be carried out in a variety of transformed domains, which separate the wavefield into angular components, including, but not limited to, wave number or slowness. The method of the invention is not restricted solely to the frequency-wave number domain or to Fourier transforms. The frequency-wave number domain and the Fourier transform are merely used in the following for illustrative purposes.

At step 22 in FIG. 2, the transformed hydrophone and geophone signals, $H_{signal}(f,\bar{k})$ and $G_{signal}(f,\bar{k})$, respectively, from step 21 are corrected for relative differences in the instrument transfer functions, which correspond to instrument impulse responses in the time domain. These corrections could either be correcting the amplitude and phase of the hydrophone data to match the geophone data, or, in an alternative embodiment, correcting the geophone data to match the hydrophone data, or, in a further alternative embodiment, correcting both data sets to a common basis. Correcting for relative differences in instrument impulse responses is well known in the art. Finally, an amplitude scaling equal to the inverse of the acoustic impedance in the water is preferably applied to the geophone data to correct for the relative differences in amplitudes of pressure and particle velocity. This is also well known in the art.

At step 23 in FIG. 2, the corrected geophone signal $G_{signal}(f,\bar{k})$ from step 22 is further corrected for angle of incidence. While a hydrophone records the total wavefield, a vertical geophone will only record the vertical part of the wavefield. This will be equal to the total wavefield only for signals which are propagating vertically, i.e. for which the angle of incidence $\Phi=0$. For any other values of $\Phi$, the geophone signal needs to be scaled by:

$$G_{total}(f,\bar{k}) = \frac{G_{signal}(f,\bar{k})}{\cos\phi}, \quad (1)$$

where $G_{total}(f,\bar{k})$ is the total wavefield, and $\cos(\Phi)$ is given by:

$$\cos(\phi) = \sqrt{1 - \sin^2(\phi)} \quad (2)$$
$$= \sqrt{1 - \frac{v^2 \cdot |k|^2}{f^2}},$$

and v is the velocity of sound in the water.

The velocity of sound in the water is well known in the art to be close to 1500 n/sec. So, if v is known, then Equation (2) shows a direct link between the angle of incident Φ and values of wave number k and frequency f. If v is not known for some reason, then it can be measured by methods well known in the art. Also, it can be seen from Equation (2) that cos(Φ) is real and different from zero for values of k given by:

$$0 \le |k| \le \frac{f}{v}. \tag{3}$$

Figure 3:
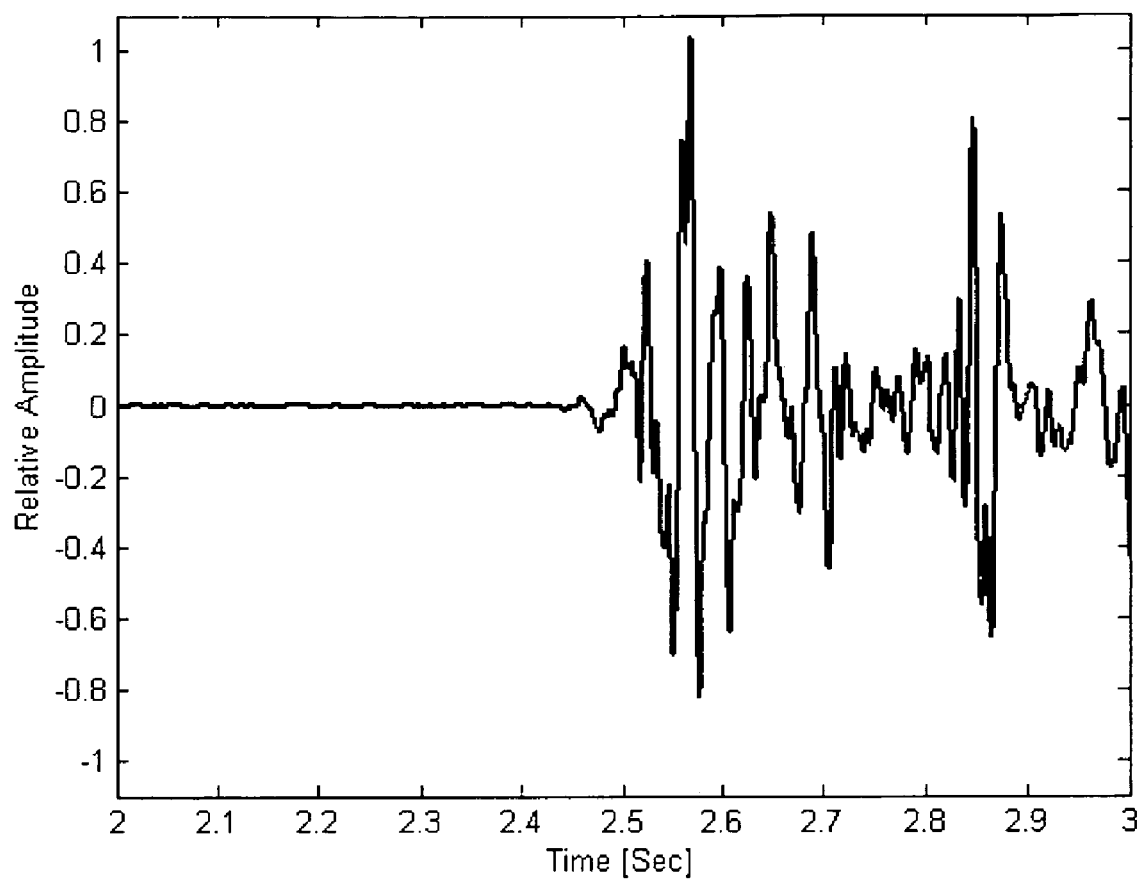
FIG. 3 is a plot of a hydrophone signal recorded at 13 m depth.
Figure 4:
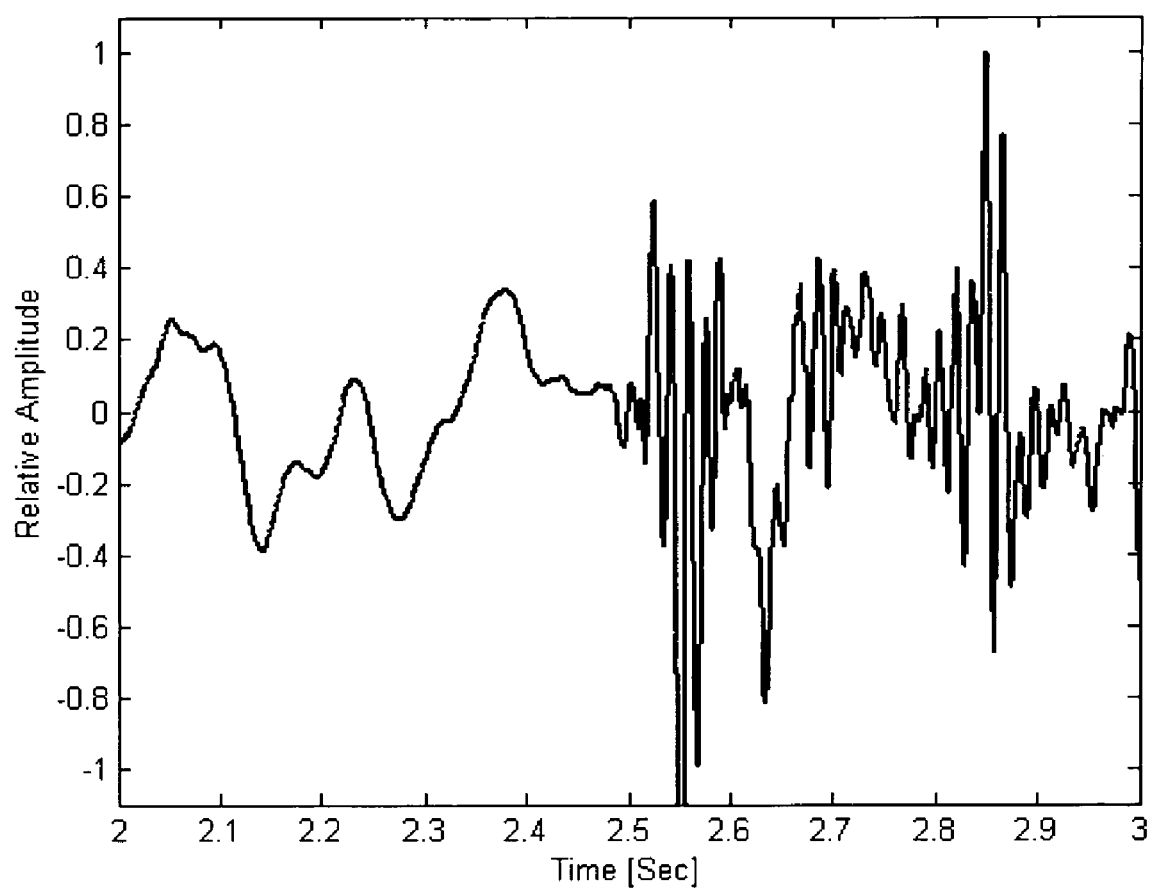
FIG. 4 is a plot of the corresponding geophone signal recorded simultaneously with the hydrophone signal in FIG. 2.
Figure 5:
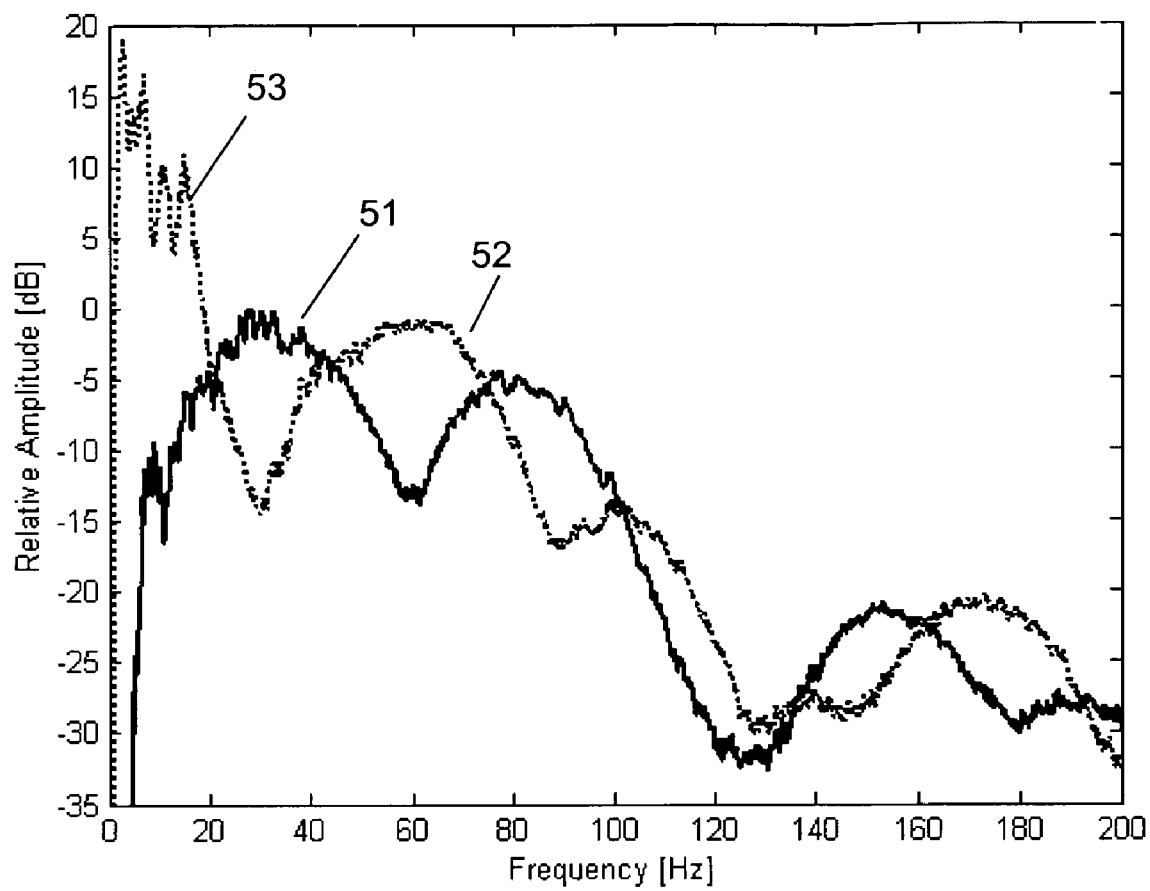
FIG. 5 is a plot of the amplitude spectra of the hydrophone and geophone signals from FIGS. 2 and 3, respectively.

Examples of single trace recordings where the corrections above have been applied (assuming vertical incident angle) are shown in FIGS. 3 and 4. FIG. 3 is a plot of amplitude versus time for a hydrophone signal recorded at 13 m depth. FIG. 4 is a plot of amplitude versus time for the corresponding geophone signal recorded simultaneously with the hydrophone signal from FIG. 3. The corresponding amplitude spectra (showing amplitude versus frequency) of the hydrophone and geophone signals are shown in FIG. 5. The solid line 51 is the spectrum of the hydrophone signal and the dotted line 52 is the spectrum of the geophone signal. The higher noise level in the geophone data can be seen by comparison of FIGS. 3 and 4. Also, it can be seen from FIG. 5 that the noise in the geophone signals is mainly confined to the lower frequencies 53.

In step 24 in FIG. 2, a low frequency part of the geophone signal is calculated from the recorded hydrophone signal. Thus, a data set $G_{calculated}(f,\bar{k})$ is generated from $H_{signal}(f,\bar{k})$ for $f_1 \le f \le f_2$, that is, for a Frequency Range $[f_1, f_2]$. In the following this procedure is described in detail.

The hydrophone signal and the geophone signal can be expressed in terms of their up-going and down-going components and the hydrophone signal (pressure wavefield) is given by the equation:

$$h_{signal}(\bar{x},t) = h\uparrow(\bar{x},t) + h\downarrow(\bar{x},t) \tag{4}$$

where $h\uparrow(\bar{x},t)$ is the up-going component and $h\downarrow(\bar{x},t)$ is the down-going component, respectively, of the hydrophone signal $h_{signal}(\bar{x},t)$. Similarly, the geophone signal (velocity wavefield) is given by:

$$g_{signal}(\bar{x},t) = g\uparrow(\bar{x},t) + g\downarrow(\bar{x},t) \tag{5}$$

where $g\uparrow(\bar{x},t)$ is the up-going component and $g\downarrow(\bar{x},t)$ is the down-going component, respectively, of the geophone signal $g_{signal}(\bar{x},t)$.

Assume that the up-going components of the hydrophone and geophone signals are the same, that is, $$h\uparrow(\bar{x},t) = g\uparrow(\bar{x},t) \tag{6}$$

Then, inserting Equation (6) into Equation (5) yields:

$$g_{signal}(\bar{x},t) = h\uparrow(\bar{x},t) + g\downarrow(\bar{x},t) \tag{7}$$

Let τ be the surface reflection time delay, that is, the time delay between the direct upward propagating arrival of the wavefield and the corresponding reflection from the surface. Using the definition of cos(Φ) given by Equation (2), the time delay τ is given by:

$$\tau = \frac{2 \cdot D \cdot |\cos(\phi)|}{v} \tag{8}$$

$$= \frac{2 \cdot D \cdot \sqrt{1 - \frac{v^2 \cdot |k|^2}{f^2}}}{v},$$

where D is the depth of the hydrophone and the geophone. The depth D may be determined by any means known in the art, such as by a depth sensor or a calculation. Assume that the reflection coefficient at the sea surface is c for pressure signals and, thus, −c for particle velocity signals. The absolute value of c is very close to unity. Also, as is well know in the art, a reflection coefficient is a function of incident angle and, in case of the sea surface which is not always flat, also a function of frequency. These are, however, minor effects with respect to the method of the invention and are thus not discussed further. Another well known but minor effect which is not included in the discussions below is the difference in geometrical spreading between the recorded direct arrival and the recorded corresponding surface reflection. Then, using τ, the down-going component $h\downarrow(\bar{x},t)$ of the hydrophone signal may be given by:

$$h\downarrow(\bar{x},t) = c \cdot h\uparrow(\bar{x},t-\tau) \tag{9}$$

Similarly, the down-going component $g\downarrow(\bar{x},t)$ of the geophone signal may be given by:

$$g\downarrow(\bar{x},t) = -c \cdot h\uparrow(\bar{x},t-\tau) \tag{10}$$

Inserting $h\uparrow(\bar{x},t)$ and $g\downarrow(\bar{x},t)$ as given by Equations (9) and (10), respectively, into Equations (4) and (7), respectively, gives:

$$h_{signal}(\bar{x},t) = h\uparrow(\bar{x},t) + c \cdot h\uparrow(\bar{x},t-\tau) \tag{11}$$

and $$g_{signal}(\bar{x},t) = h\uparrow(\bar{x},t) - c \cdot h\uparrow(\bar{x},t-\tau) \tag{12}$$

Next, the hydrophone and geophone signals expressed in terms of their up-going and down-going components in Equations (11) and (12) are transformed to the frequency-wave number domain. Preferably, the transform is a Fourier Transform, but this is not a restriction of the invention. Transforming Equation (11) to the frequency-wave number domain gives:

$$H_{signal}(f,\bar{k}) = H\uparrow(f,\bar{k}) + c \cdot H\uparrow(f,\bar{k}) \cdot \exp(-i2\pi f\tau) \tag{13}$$

$$= H\uparrow(f,\bar{k})[1 + c \cdot \exp(-i2\pi f\tau)].$$

Solving Equation (13) for the up-going component of the hydrophone signal yields:

$$H\uparrow(f,\bar{k}) = \frac{H_{signal}(f,\bar{k})}{1 + c \cdot \exp(-i2\pi f\tau)}. \tag{14}$$

As above, transforming Equation (12) to the frequency-wave number domain gives:

$$G_{signal}(f,\bar{k}) = H\uparrow(f,\bar{k}) - c \cdot H\uparrow(f,\bar{k}) \cdot \exp(-i2\pi f\tau) \tag{15}$$

$$= H\uparrow(f,\bar{k})[1 - c \cdot \exp(-i2\pi f\tau)].$$

Now, a geophone signal $G_{calculated}(f,\bar{k})$ may be calculated from the hydrophone signal $H_{signal}(f,\bar{k})$ in the frequency-wave number domain. Inserting $H\uparrow(f,\bar{k})$ as given by Equation (14) into Equation (15) yields the geophone signal calculated from the hydrophone signal by:

$$G_{calculated}(f,\bar{k}) = H_{signal}(f,\bar{k}) \cdot \frac{1 - c \cdot \exp(-i2\pi f\tau)}{1 + c \cdot \exp(-i2\pi f\tau)}. \tag{16}$$

where frequency f is given by $f_1 \le f \le f_2$ and wave number k is as in Equation (3). Equation (16) may be used to calculate a geophone signal from the recorded hydrophone signal at low frequencies where the signal-to-noise ratio of the recorded geophone signal is insufficient for processing needs.

Equation (16) is stable if the denominator on the right hand side is different from zero. Assuming that c=−1 exactly, then the denominator equals 0 when $$1 = \exp(-i2\pi f\tau) \tag{17}$$

that is, for f=0, 1/τ, 2/τ, .... Thus, $f_1$ must be larger than zero. A typical value will be 3 Hz. To avoid artifacts in the time domain, proper tapering, which is well known in the art, should be applied to the low-frequency part of the spectrum of the calculated geophone signal.

As can be seen from Equation (8):

$$\frac{1}{\tau} = \frac{v}{2 \cdot D \cdot |\cos(\phi)|}, \tag{18}$$

which has its lowest value for Φ=0, that is, for vertically propagating signals. This means that $f_2$ must be less than v/2 D. Assuming that the geophone signal is too noisy to be used for frequencies below $f_{noise}$, then $f_{noise} < f_2 < v/2$ D.

Preferably, the difference between $f_2$ and $f_{noise}$ should be large enough so that the calculated geophone signal from (16) can be compared and checked with the measured geophone signal. A range of overlapping frequencies is preferred to merge the calculated portion of the geophone signal with the measured portion. Typically $f_2$ should be 5-10 Hz larger than $f_{noise}$. To maintain a good signal-to-noise ratio of the hydrophone signal, $f_2$ should be significantly lower than v/2 D and preferably not larger than around 75% of v/2 D In the data examples shown in FIGS. 3-5, the depth D of the sensors is 13 m. Assuming a water velocity v of 1500 m/s gives a first notch in the hydrophone spectrum at around v/2 D, or about 58 Hz. This indicates that $f_2$ should be less than around 75% of v/2 D, or about 43 Hz.

In step 25 in FIG. 2, the calculated and the recorded part of the geophone signal are merged into one data set. To avoid artifacts in the data, in particular in the time domain, the merger should preferably be done with a tapering zone. In practice this tapering zone will be the frequencies between $f_{noise}$ and $f_2$, even if a narrower frequency zone can be selected.

Below is one method of applying weights to the two data sets before the merging of the two data sets. There are other ways of calculating weights which are well known in the art so this is not a restriction of the invention. A weight, w(f) is calculated as:

$$w(f) = \frac{f - f_{noise}}{f_2 - f_{noise}}, \text{ for } f_{noise} \leq f \leq f_2. \tag{19}$$

Thus, w(f)=0 for f=$f_{noise}$ and w(f)=1 for f=$f_2$. The merged total geophone data set will then be:

There are several ways of calculating weights to merge signals which are well known in the art, and the one used above is just one example. Alternatively, it is possible to merge the amplitude and phase spectra of the two data sets separately. In this alternative embodiment, the actual weight function is complex.

Figure 6:
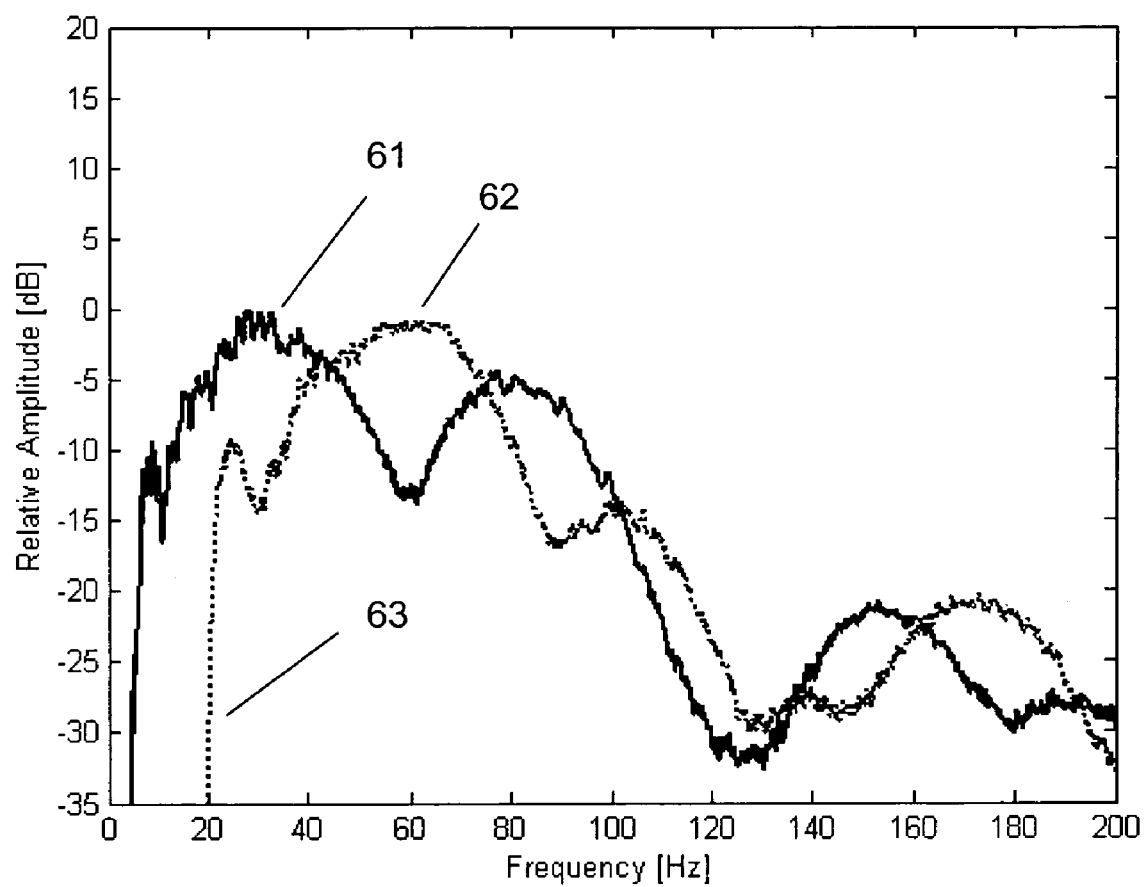
FIG. 6 is a plot of the amplitude spectra of the hydrophone and tapered geophone signals from FIG. 4.
Figure 7:
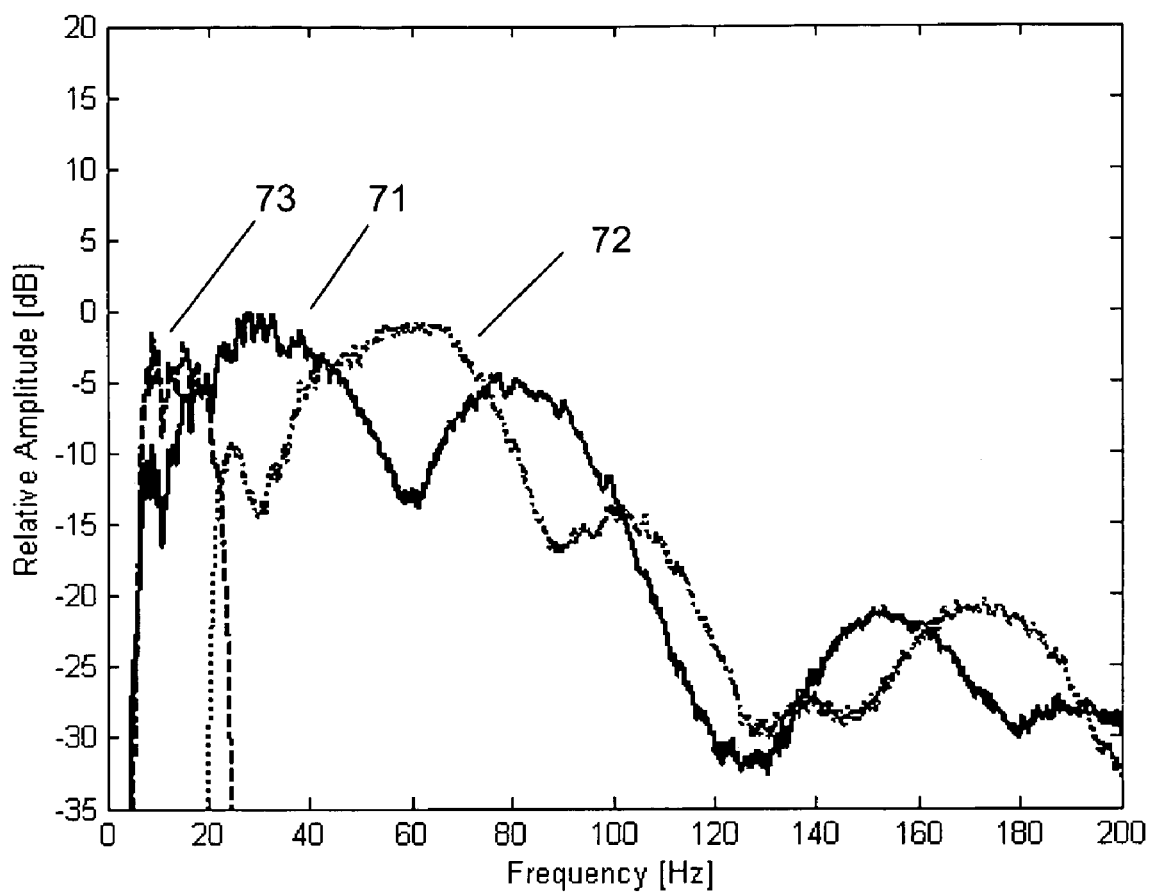
FIG. 7 is a plot of the amplitude spectra of the hydrophone and tapered geophone signals, as in FIG. 5, and, in addition, a calculated and tapered geophone signal amplitude spectrum.

In the following example illustrated in FIGS. 6-9, the data from FIG. 5 will be used to illustrate the procedure in step 24 and 25 in FIG. 2. From FIG. 5, it can be estimated that $f_{noise}$ is about 20 Hz. To get an interval to merge, $f_2$ has been set to 25 Hz. FIG. 6 is a plot of the amplitude spectra of the hydrophone and geophone signals from FIG. 5. The solid line 61 is the spectrum of the hydrophone signal and the dotted line 62 is the spectrum of the geophone signal. The amplitude of the geophone signal 51 from FIG. 5 has been tapered with a linear function between 20 and 25 Hz and set to zero below 20 Hz (at reference number 63) to give the amplitude of the geophone signal 61 in FIG. 6. FIG. 7 includes a geophone signal 73 which has been calculated from the hydrophone signal from equation (11) in the 3-25 Hz frequency range, and linearly tapered on the low frequency side and between 20 and 25 Hz. The solid line 71 is the spectrum of the hydrophone signal and the dotted line 72 is the spectrum of the geophone signal taken from FIG. 6.

Figure 8:
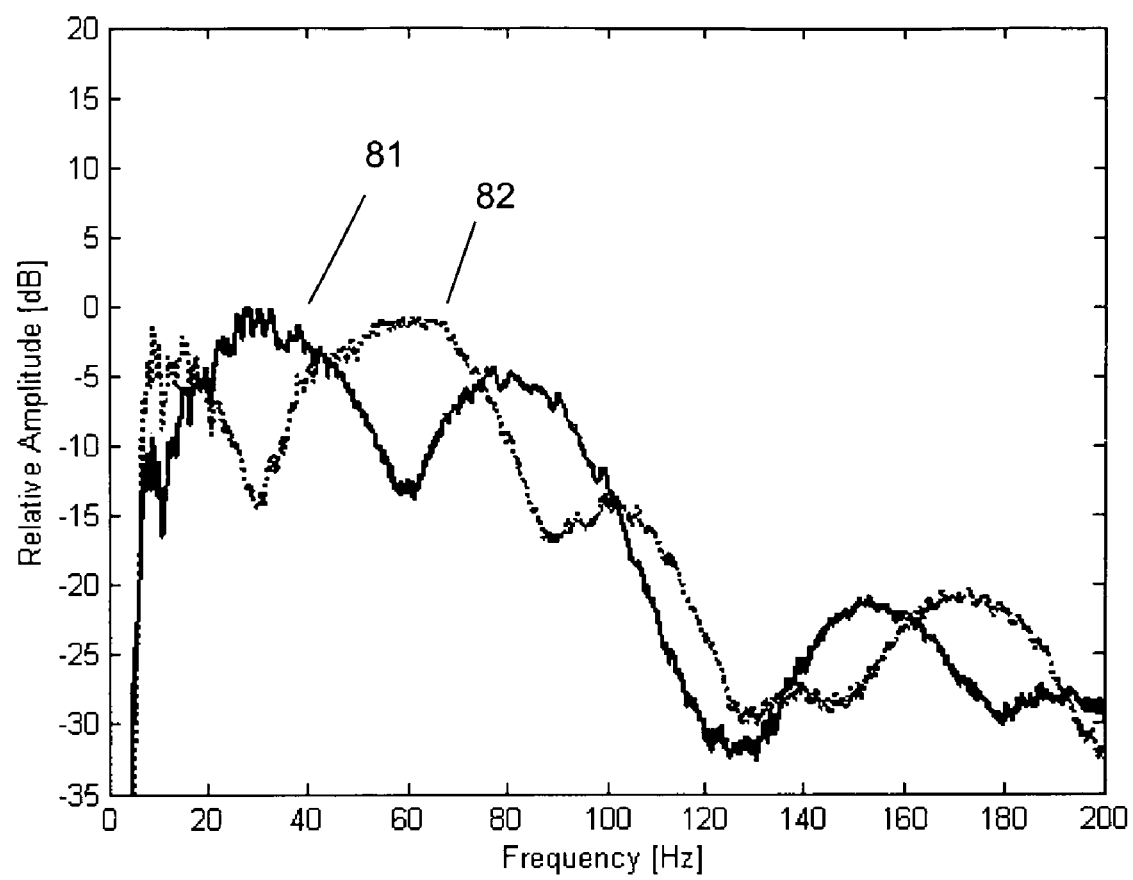
FIG. 8 is a plot of the amplitude spectra of the hydrophone and merged geophone signals from FIG. 7.

FIG. 8 shows the amplitude spectra of the recorded hydrophone data 81 and the merged (constructed) geophone data 82. The geophone signal 82 has been merged using Equation (20). It can be seen that the hydrophone and geophone data sets now have essentially the same bandwidth.

In step 26 in FIG. 2, the full bandwidth constructed geophone data set and full bandwidth recorded hydrophone data set are added or subtracted to calculate the full bandwidth up- and down-going wavefield, respectively. This can be done by:

$$u(\bar{x}, t) = \frac{h_{signal}(\bar{x}, t) + g_{constructed}(\bar{x}, t)}{2} \text{ and} \tag{21}$$

$$d(\bar{x}, t) = \frac{h_{signal}(\bar{x}, t) - g_{constructed}(\bar{x}, t)}{2}. \tag{22}$$

where u(x,t) and d(x,t) are the up- and down-going wavefields, respectively. The separation can also be done in the frequency domain by:

$$U(f, \bar{x}) = \frac{H_{signal}(f, \bar{x}) + G_{constructed}(f, \bar{x})}{2} \text{ and} \tag{23}$$

$$D(f, \bar{x}) = \frac{H_{signal}(f, \bar{x}) - G_{constructed}(f, \bar{x})}{2}. \tag{24}$$

Figure 9:
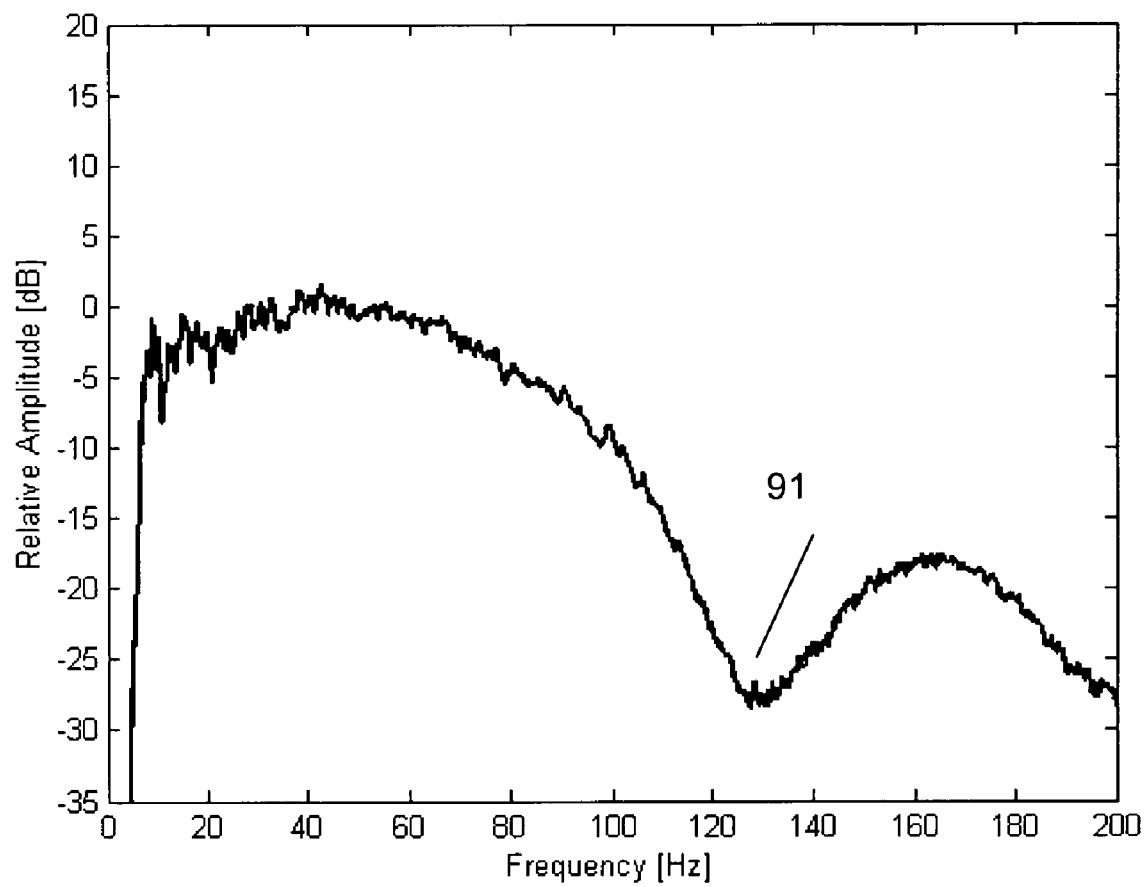
FIG. 9 is a plot of the amplitude spectra of the up-going wavefield generated by summing the hydrophone and geophone signals from FIG. 7.

The amplitude spectrum of the up-going wavefield, |U(f)|, after summing the hydrophone 81 and geophone 82 data in FIG. 8 using Equation (23), is shown in FIG. 9. As can be seen from FIG. 9, the effect of the surface reflection on the receiver $$G_{constructed}(f, \bar{k}) = \begin{cases} G_{calculated}(f, \bar{k}), & \text{for } f \leq f_{noise}, \\ [1 - w(f)] \cdot G_{calculated}(f, \bar{k}) + w(f) \cdot G_{total}(f, \bar{k}), & \text{for } f_{noise} < f \leq f_2, \\ G_{total}(f, \bar{k}), & \text{for } f > f_2. \end{cases} \tag{20}$$

side is removed. The notch 91 at around 125 Hz is the surface reflection notch at the source side with the source at around 6 m depth.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for combining recorded signals of a pressure sensor and a particle motion sensor located in a towed marine seismic streamer to improve signal to streamer vibration noise ratio in the particle motion sensor signal, comprising:
    converting seismic signals recorded in the towed marine seismic streamer into a particle motion sensor signal, the seismic signals representative of characteristics of subsurface earth formations and acquired by deployment of a plurality of pressure sensors and particle motion sensors overlying an area of the earth's subsurface to be evaluated, the sensors generating at least one of an electrical and optical signal in response to seismic energy, by the following:
    calculating at least a portion of a particle motion sensor signal from the recorded pressure sensor signal; and
    merging the calculated at least a portion of the particle motion sensor signal with the recorded particle motion sensor signal to generate a particle motion sensor signal in which signal to streamer vibration noise ratio is substantially improved in at least a lower frequency range thereof, useful for imaging the earth's subsurface.

2. The method of claim 1, wherein the pressure sensors comprise hydrophones.

3. The method of claim 1, wherein the particle motion sensors comprise geophones.

4. The method of claim 1, wherein the particle motion sensors comprise accelerometers.

5. The method of claim 1, wherein the particle motion sensors comprise sensors which can measure more than one particle motion wavefield component.

6. The method of claim 1, wherein the particle motion sensors and the pressure sensors are co-located.

7. The method of claim 1, wherein the particle motion sensors and the pressure sensors are located so that recorded signals from the sensors can be used to calculate corresponding data sets at substantially the same location.

8. The method of claim 1, wherein the recorded pressure sensor signal and the recorded particle motion sensor signal are corrected for relative differences in instrument impulse response.

9. The method of claim 1, wherein relative amplitudes of the recorded pressure sensor signal and the recorded particle motion signal are corrected for relative differences in amplitudes of pressure and particle motion.

10. The method of claim 1, wherein the recorded particle motion signal involving a plurality of streamers is compensated for effects of differences in incident angle in frequency-wave number domain, $(f, k_x, k_y)$.

11. The method of claim 1, wherein the recorded particle motion signal involving a single streamer is compensated for effects of differences in incident angle in frequency-wave number domain, $(f, k_x)$, keeping the wave number in y direction $k_y$, constant for each streamer.

12. The method of claim 1, wherein the recorded particle motion signal involving a single sensor or group of sensors is compensated for effects of differences in incident angle in frequency domain, $(f)$, keeping wave numbers in x and y directions, $k_x$ and $k_y$, respectively, constant for each sensor.

13. The method of claim 1, wherein the at least a portion of the particle motion signal $G_{calculated}(f,\overline{k})$ is calculated in the frequency-wave number domain, from a recorded pressure signal $H_{signal}(f,\overline{k})$ by $$G_{calculated}(f,\overline{k}) = H_{signal}(f,\overline{k}) \cdot \frac{1 - c \cdot \exp(-i2\pi f \tau)}{1 + c \cdot \exp(-i2\pi f \tau)},$$

where f is frequency, $\overline{k}=(k_x, k_y)$ is a wave number with $k_x$ a wave number in an x direction and $k_y$ a wave number in a y direction, c is reflection coefficient at sea surface and $\tau$ is time delay between a direct arrival and a surface reflection.

14. The method of claim 13, wherein the time delay $\tau$ is given by the following equation:

$$\tau = \frac{2 \cdot D \cdot \sqrt{1 - \frac{v^2 \cdot |k|^2}{f^2}}}{v},$$

where D is depth of the pressure sensors and particle motion sensors and v is velocity of sound in the water.

15. The method of claim 13, wherein the merging is done with tapering of the signals in an overlapping frequency interval.

16. The method of claim 15, wherein the tapering of the signals is carried out by merging the amplitude and the phase spectra separately.

17. The method of claim 13, wherein the at least a portion of the particle motion signal $G_{calculated}(f,k_x,k_y)$ is calculated in the frequency-wave number domain, $(f,k_x,k_y)$, from a recorded pressure signal $H_{signal}(f,k_x,k_y)$ involving data from a plurality of streamers by $$G_{calculated}(f, k_x, k_y) = H_{signal}(f, k_x, k_y) \cdot \frac{1 - c \cdot \exp(-i2\pi f \tau)}{1 + c \cdot \exp(-i2\pi f \tau)}.$$

18. The method of claim 13, wherein the at least a portion of the particle motion signal $G_{calculated}(f,k_x)$ is calculated in the frequency-wave number domain, $(f,k_x)$ from a recorded pressure signal $H_{signal}(f,k_x)$ involving data from a single streamer by $$G_{calculated}(f, k_x) = H_{signal}(f, k_x) \cdot \frac{1 - c \cdot \exp(-i2\pi f \tau)}{1 + c \cdot \exp(-i2\pi f \tau)},$$

where $k_y$ is kept constant for each streamer.

19. The method of claim 13, wherein the at least a portion of the particle motion signal $G_{calculated}(f)$ is calculated in the frequency (f) domain from a recorded pressure signal $H_{signal}(f)$ involving data from a single sensor or group of sensors by $$G_{calculated}(f,) = H_{signal}(f) \cdot \frac{1 - c \cdot \exp(-i2\pi f \tau)}{1 + c \cdot \exp(-i2\pi f \tau)},$$

where $k_x$ is kept constant for each sensor and $k_y$ is kept constant for each sensor.

20. The method of claim 1, wherein the recorded pressure signal and the particle motion signal in which signal-to-streamer vibration noise is substantially improved are combined to calculate total up- and down-going wavefields.

* * * * *

UNITED STATES PATENT AND TRADEMARK OFFICE
CERTIFICATE OF CORRECTION

PATENT NO. : 7,684,281 B2　　　　　　　　　　　　　　　　　　　　　　　　　　Page 1 of 1
APPLICATION NO. : 12/082804
DATED : March 23, 2010
INVENTOR(S) : Svein Torleif Vaage, Stig Rune Lennart Tenghamn and Claes Nicolai Borresen It is certified that error appears in the above-identified patent and that said Letters Patent is hereby corrected as shown below:

Column 9, line 2: replace "n/sec" with "m/sec".

Claim 13, column 14, lines 5 and 7: replace "F" with "f".

Claim 18, column 14, lines 41 and 42: replace "$k_y$" with "$k_x$".

Signed and Sealed this

Eleventh Day of May, 2010

David J. Kappos
*Director of the United States Patent and Trademark Office*